United States Patent Office 3,637,870
Patented Jan. 25, 1972

3,637,870
PROCESS OF MANUFACTURING PARA-PHENYL-PHENOLS
Jean Berthoux, Decines, and Robert Gac, Caluire, France, assignors to Progil, Paris, France
No Drawing. Filed Jan. 22, 1969, Ser. No. 793,172
Claims priority, application France, Jan. 26, 1968, 49,573
Int. Cl. C07c 39/12
U.S. Cl. 260—620                                    5 Claims

ABSTRACT OF THE DISCLOSURE

A process of manufacturing para-phenylphenols by heating a 1,1-bis (4-hydroxy-phenyl) cyclohexane to a temperature of between 200° C. to 350° C. in the presence of a platinum metal catalyst under atmospheric pressure, the reaction continuing until hydrogen release stops.

---

The present invention relates to a new process of manufacturing para-phenylphenols, which may be substituted with alkyl radicals, starting from 1,1-bis (4-hydroxyphenyl) cyclohexanes, and more particularly to the preparation of para-phenyl-phenol from 1,1-bis (4-hydroxyphenyl) cyclohexane (called hereinafter diphenylolcyclohexane). It is thus an object of the invention to effect diphenylol cyclohexane cleavage and dehydrogenation in only one stage, in the presence of a dehydrogenation catalyst.

It is known that there are several processes for the manufacture of phenyl-phenols, among which the best known use biphenyl, as a raw material. It is then generally processed by two methods which are either biphenyl monochorination, followed by hydrolysis of the chlorinated derivative achieved most frequently in an alkaline medium, or biphenyl sulfonation and alkaline fusion of the biphenyl-sulfonic acid. The chlorination method often gives a mixture of phenylphenol isomers. The sulfonation method constitutes a complex process.

Moreover, technics for cleavage of diphenylolcyclohexane have already been described, leading by splitting off a molecule of phenol, to p-cyclohexenyl-, and possibly p-cyclohexyl-phenol. Further it is possible, according to an old process to obtain p-phenyl-phenol by p-cyclohexylphenol dehydrogenation.

Diphenylolcyclohexane cleavage technics have been described in two patents. One of them—British Patent No. 310,832 dated Jan. 28, 1928—describes a very general process consisting of heating the raw material at a high temperature. The method is achieved for example, by distillation of the starting product, preferably under vacuum. The operation may be achieved without any catalyst or in the presence of an acid catalytic compound such as gaseous hydrogen chloride or zinc chloride. No numerical indication concerning the quantities of the products obtained were given in this patent. Applicants have made series of tests using several variants of this process and have obtained the following results:

A yield of 98% in p-cyclohexenyl-phenol, when operating by means of thermal cleavage (270-295° C.) without any catalyst and under vacuum (pressure: 30 mm. Hg).

A yield equal to 60% or less, according to reaction times, in a mixture of p-cyclohexenyl- and p-cyclohexyl-phenols, when operating by thermal cleavage (305±5° C.) without any catalyst and under atmospheric pressure.

The formation of a small quantity of p-cyclohexyl- and p-cyclohexenyl-phenols along with numerous resinous products, when operating by means of catalytic cleavage with the help of gaseous hydrogen chloride and under atmospheric pressure.

The second patent relating to diphenylolcyclohexane cleavage—German Pat. No. 1,235,894 dated Aug. 18, 1959—includes the preparation of p-cyclohexenyl-phenol in a general technic of alkenylphenols fabrication, by heating of the convenient bis (hydroxyaryl) compounds in the presence of derivatives of alkalis, alkaline earth metals, aluminium, zinc, cadmium and lead. In the example concerning diphenylolcyclohexane the raw material is heated in the presence of sodium hydroxide, and the reaction products—phenol and p-cyclohexenyl-phenol—are distilled under pressure of 15 mm. Hg. The yield in p-cyclohexenylphenol is 96% of theoretical.

The dehydrogenation of cyclohexylphenols, and especially the para isomer, has been described in the U.S. Pat. No. 1,862,000 dated July 16, 1930. The method consists in heating the starting product at 185-350° C. in vapor or liquid phase, in the presence of a dehydrogenation catalyst, such as palladium, platinum or nickel. The yields announced in the examples are from the range of about 93 to 95% with regard to the raw material, when operating under reduced pressure.

Further, it should be noted that recent patents which claim para-cyclohexenyl-phenol dehydrogenation in the presence of catalysts or agents favoring this reaction, provide, beside the classical process of diphenylolcyclohexane cleavage and p-cyclohexenylphenol dehydrogenation in two stages, the simultaneous achievement of those two operations in the joint presence of an acid or basic cleavage catalyst and of a dehydrogenation agent or catalyst.

Thus, a study of the prior art shows that, to obtain para-phenylphenol from diphenylol-cyclohexane it is necessary, either to proceed to two distinct operations, that is raw material cleavage and p-cyclohexyl- (or cyclohexenyl) phenol dehydrogenation or to achieve only one operation by working in the simultaneous presence of a cleavage catalyst and of a dehydrogenation catalyst. Moreover, as seen from the quantitative point of view, the examination of known technics emphasizes that an acceptable yield of para-phenyl phenol with regard to the used diphenylolcyclohexane may only be obtained if reactions—and especially cleavage—are achieved under vacuum.

However it has surprisingly now been discovered that it was possible to prepare p-phenylphenol from diphenylolcyclohexane in only one stage, in the absence of cleavage catalyst and with a good yield, even when working at atmospheric pressure.

In its most general way, the process according to the present invention consists in subjecting a possibly substituted diphenylol-cyclohexane to a temperature, at least equal to its melting point, in the presence, as a dehydrogenation catalyst, of a metal of the group VIII of the Periodic System. The reaction takes place according to the following equation:

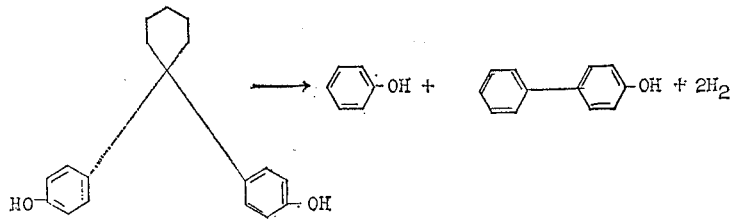

In this equation, the cyclohexyl ring may bear a lower alkyl substituent preferably placed in para position with regard to the tetra-substituted carbon of the diphenylol-cyclohexane, while phenyl rings may have one or several lower alkyl substituents placed preferably in ortho position with regard to the phenolic function.

Generally the process is conducted in such a way that the phenol resulting from the raw material cleavage is distilled as formed, while the para-phenylphenol obtained remains in the reaction mass. The hydrogen released permits the reaction development to be followed, this release stopping when the reaction is completed.

The range of temperatures usable in the process according to the invention is from approximately 200 to 350° C. The reaction is initiated as soon as 200° C. is slightly exceeded, but in order to cause a quicker diphenylol-cyclohexane conversion it is better to operate at a higher temperature range and particularly between 260 and 310° C.

As indicated above, group VIII metals of the Periodic System are used as catalyst. Among these, platinum metals are preferred, that is, platinum, ruthenium, rhodium, osmium, iridium and more especially palladium. They are used as metals which may be deposited on classical type inert supports, such as, for example, activated charcoal. The quantity of catalytic metal used is generally between 0.05 and 1, preferably 0.1 to 0.5% with regard to the weight of the raw material to be treated. When metal is deposited on an inert support, it is present in the catalytic mass in a quantity of about 2 to 10% related to the total weight of this mass.

The present process has the great advantage of being usable at a normal pressure, but it is quite obvious that any achievement of those technics using a different pressure enters the invention field.

The diphenylolcyclohexane which may be treated according to the present process to obtain p-phenylphenol, is the product obtained by means of the classical technics of cyclohexanone and phenol condensation. Besides it is not necessary, for the achievement of the method of the present invention, to use an absolutely pure compound. It is quite possible to use a phenol/cyclohexanone condensation product, having been submitted only to a partial treatment of separation and/or purifications such as crystallization or stripping.

It should be noted that diphenylolcyclohexane fabrication is a relatively easy reaction, giving a good yield of the desired product. In such conditions, the use of this raw material in the process of manufacturing para-phenyl phenol according to the invention, is a great advantage in comparison with the processes starting, for example, from paracyclohexylphenol. The preparation of this compound, by phenol and cyclohexane or cyclohexanol condensation, involves the simultaneous formation of ortho- and meta-isomers, the presence of which, in a strong concentration, constitutes an impediment for obtaining p-phenylphenol.

As indicated hereinabove, the process according to the invention may be applied not only to diphenylol-cyclohexane, but also to its homologs, that is to compounds bearing lower alkyl substituents on the cyclohexyl radical and/or on the phenolic rings. Such compounds are obtained by condensation, for example, of methylcyclohexanone and phenol, or cyclohexanone and cresol or of methylcyclohexanone and cresol. Then by the dehydrogenating cleavage, according to the invention, the corresponding substituted para-phenyl-phenols are obtained.

Practically, the process according to the present invention may be achieved in a continuous or discontinuous manner, in any apparatus of a classical type. For example, a reactor may be used which is provided with a heating system and a temperature regulator, and surmounted with a distillation column connected to a condenser, and preferably to a gas measuring device. During the reaction, the gases and vapors formed, principally phenol and hydrogen, leave the reactor, pass through the distillation column to reach the condenser. The phenol condensate is recovered, while hydrogen, after possible passage into a volumetric measuring device, is also recovered. The para-phenyl-phenol formed remains in the reactor, whence it is drawn off, in a continuous or discontinuous way, according to the case.

It is recommended that at the beginning of the operation the raw material is melted under an inert gas atmosphere, such as for example, nitrogen, then, after the product has melted to stop the gas passage and stir the mass during reaction.

An advantageous utilization of the method according to the invention, consists of achieving a series of successive discontinuous operations, using the same catalyst lot. In this manner it is easy to use a reactor in the bottom of which is placed a filtration device for retaining the catalyst and which is connected to a receiving tank for the reaction product. At the end of every operation the reaction liquid is drawn off into this receiving tank, while hot, and the reactor is loaded again with a new quantity of the raw material to be treated.

The examples, hereinafter, given in a non limitative way numerically illustrate the process according to the present invention. Unless otherwise indicated the parts and percentages are given by weight.

EXAMPLE 1

For this example, the following apparatus was used: a reactor provided with a fritted material plate, a feed pipe, an inlet for inert gas, a stirrer, a thermocouple and an outer heating system; a receiving tank for the reaction liquid communicating with the reactor bottom by means of a pipe provided with a valve; a distillation column surmounting the reactor; a condenser connected to the column; a receiving tank for the condensed products; and finally a gas meter communicating with the condenser.

There are introduced into the reactor 400 parts of pure diphenylolcyclohexane and 20 parts of a catalyst made up of palladium deposited on activated charcoal and containing 5% by weight of palladium. The raw material was melted by heating at about 200° C. under a nitrogen atmosphere. After stopping the nitrogen stream, the reaction medium was brought to about 270° C. and was maintained at this temperature with stirring during all the reaction, at a normal pressure. When hydrogen releasing stopped at the end of 2 hours, heating was stopped and the reaction liquid was drawn off. Then 16 successive identical operations were conducted by loading the reactor each time with 400 parts of diphenylol-cyclohexane and in utilizing the same catalyst. It was operated at a reaction temperature of 305±5° C. Diphenylolcyclohexane conversion times ranged from 2 to 5½ hours.

The total amount of products obtained were:

2240 parts of a head product, recovered in the receiving tank connected to the condenser.

4470 parts of the reaction product, recovered in the tank connected to the reactor.

1090 parts by volume of hydrogen.

By means of chromatography analysis it was determined that the condensate contained 98.4% of phenol, while the product drawn off from the reactor contained 87% of para-phenyl-phenol, 2.5% of diphenylol-cyclohexane, the remainder being constituted, of about 2% of heavy products, and the remainder, of phenol and biphenyl. This represented a diphenylolcyclohexane conversion rate of about 98.4%, a phenol yield of 97.7% and a p-phenyl-phenol yield greater than 90%, with respect to the raw material used.

As a comparison, diphenylolcyclohexane was submitted to a thermal treatment at 305°±5° C. under atmospheric pressure, in the device described hereinabove, but without using any catalyst. The tests lasted respectively, 1, 2, 4 and 8 hours. The obtained results, determined by means of chromatography analysis are given in the table hereinafter.

EXAMPLE 4

In the apparatus of Example 1, there was treated in the presence of 20 parts of activated charcoal containing 5% of palladium, 400 parts of a loading of raw diphenylol-cyclohexane, obtained after only stripping of the phenol and cyclohexanone condensation product. The reaction achieved at about 305° C. under atmospheric pressure, lasted 3 hours.

The liquid drawn off from the reactor contained 215 parts of para-phenyl-phenol, which represented a yield of 85% with regard to the starting raw product.

Moreover, it was noted that after 17 successive operations achieved on the same catalyst, that the catalyst had not lost its activity any more than in Example 3, after a similar number of tests.

EXAMPLE 5

A loading of 400 parts of pure diphenylol cyclohexane was treated at 300±10° C. under atmospheric pressure, in the apparatus of Example 1, using as a catalytic mass 20 parts of powdered alumina impregnated with platinum, with 5% of Pt. The reaction ended at the end of 2 hours 40 minutes. A diphenylol-cyclohexane transformation rate of 99.0%, a yield in phenol of 95% and a yield in para phenol of 85% was obtained.

EXAMPLE 6

In the apparatus of Example 1, there was treated at 300±10° C. under atmospheric pressure, in the presence of 31 parts of activated charcoal containing 5% of palladium, 620 parts of a mixture of 1,1-bis-(4-hydroxyphenyl) 4-methylcyclohexane and phenol, with 32% of phenol, obtained by condensing 4-methyl-cyclohexanone and phenol.

The reaction time was 1 hour 40 minutes. The conversion rate of the diphenol was greater than 95% and the yields, with regard to this raw material, were 99% for phenol and 80% for 4-(4-methyl-phenyl) phenol.

TABLE I

| Reaction time in hours | Conversion rate of the diphenylol cyclohexane, percent | Para-phenyl-phenol, percent | Para-cyclohexyl- and para cyclohexenyl phenol, percent | Heavy products, percent | Phenol yield, percent | Yield in p-cyclohexyl- and cyclohexenyl-phenol,[1] percent |
|---|---|---|---|---|---|---|
| 1 | 59 | 1.7 | 29.9 | 16.0 | | |
| 2 | 96.3 | 2.1 | 53.1 | 37.6 | 90 | 60 |
| 4 | >97 | 3.4 | 49.4 | 46.6 | 99 | 49 |
| 8 | >97 | 3.3 | 43.6 | 52.6 | 99 | 43 |

[1] With regard to diphenylolcyclohexane.

This example shows that the process according to the present invention leads to a good yield in para phenyl-phenol and that, inversely, diphenylolcyclohexane thermal cleavage at atmospheric pressure, according to the prior art, gives only a negligible quantity of p-phenylphenol and an insufficient yield in hydrogenated intermediary products.

EXAMPLE 2

17 successive operations were achieved under the same conditions as in the previous example, using 400 parts of raw material in each operation, but using only 8 parts of catalyst. The applied temperature was about 305° C., the reaction times varied between 3½ and 14 hours.

There was obtained a mean yield with regard to the diphenylolcyclohexane used—calculated based on all of the operations—of 95% in phenol and 91% in para-phenyl phenol.

EXAMPLE 3

Series of 17 operations were achieved again under the same conditions as in Example 1, but using as raw material, a molecular complex of phenol-diphenylolocyclohexane with 26% of phenol, obtained by recrystallization from the raw phenol and cyclohexanone condensation product. The times of the reactions achieved at 300–310° C. under normal pressure varied between 1½ and 8 hours. The obtained mean yield, calculated with regard to the diphenylcyclohexane used, was 96% for phenol and 90% for p-phenylphenol.

What is claimed is:

1. A process of manufacturing p-phenylphenols comprising subjecting a compound of the formula

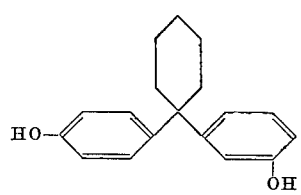

or a compound of said formula having a lower alkyl substituent to a temperature of 200 to 350° C. at atmospheric pressure in the presence of a platinum group metal catalyst to simultaneously effect cleavage and dehydrogenation and thereby obtain a said p-phenylphenol.

2. A process according to claim 1 wherein the catalyst is palladium.

3. A process according to claim 1 wherein the catalyst is deposited on an inert support.

4. A process according to claim 3 wherein the inert support is activated charcoal.

5. A process according to claim 1 wherein said temperature is maintained until the stopping of the release of hydrogen, the phenol coming from the reaction being recovered by distillation as it is formed, while the para-phenyl-phenol obtained remaining in the reaction mass.

References Cited

UNITED STATES PATENTS 1,862,000  6/1932  Britton et al. _____ 260—620

FOREIGN PATENTS 310,832  4/1929  Great Britain _____ 260—620

HOWARD T. MARS, Primary Examiner

U.S. Cl. X.R.

23—210; 260—621 R, 621 H, 621 R